DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 18

T896,015
PREVENTION OF FIBER SHEDDING FROM NAPPED POLYESTER BLANKETS

Howard M. Lewis, 14525 S. Pines Cove, Dallas, Tex. 75234

Filed Jan. 11, 1971, Ser. No. 105,633
Int. Cl. B32b *27/08, 27/36*
U.S. Cl. 117—138.8 F
No Drawing. 10 Pages Specification

Fiber shedding of a napped polyester blanket is prevented by treating the napped fabric with an aqueous dispersion or emulsion of a resinous composition containing a plurality of self cross-linking acrylic polymers such as methylacrylate and ethylacrylate. Upon evaporation of the aqueous medium and curing by application of heat minute amounts of resinous copolymer formed in the curing stage find their way between the polyester fibers at points of contact and serve to spot weld these fibers at the contact points. The resulting napped blanket product is immune or highly resistant to fiber shedding in normal use or laundering and capable of retaining its original inherent loft, fluffiness and resiliency under such conditions.